United States Patent [19]

Dienstbach

[11] 4,405,569

[45] Sep. 20, 1983

[54] HYDROMETALLURGICAL PROCESS FOR EXTRACTING METAL VALUES FROM COMPLEX ORES CONTAINING ARSENIC AND SULFUR

[75] Inventor: Ulrich Dienstbach, New Liskeard, Canada

[73] Assignee: Sulpetro Minerals Limited, Toronto, Canada

[21] Appl. No.: 318,150

[22] Filed: Nov. 4, 1981

[51] Int. Cl.³ .................. C01G 5/00; C01G 51/00; C01G 28/02; C22B 3/00

[52] U.S. Cl. ............................ 423/27; 423/29; 423/34; 423/37; 423/41; 423/101; 423/87; 423/150; 423/602

[58] Field of Search ............ 423/29, 34, 37, 41, 423/47, 87, 140, 150, 602; 75/117, 119

[56] References Cited

U.S. PATENT DOCUMENTS

| | | | |
|---|---|---|---|
| 515,418 | 2/1894 | Janin | 423/37 |
| 2,304,722 | 12/1942 | Witman | 423/602 |
| 2,951,741 | 9/1960 | Sill | 423/87 |
| 4,029,733 | 6/1977 | Faugeras | 423/41 |

OTHER PUBLICATIONS

Chemical Abstracts, vol. 77, (1972), No. 51317f.
Ind. & Eng. Chem., vol. 49, No. 10, (Oct. 1957), p. 30A, "Sill Process Now On Stream".
Chemical Abstracts, vol. 54, (1960), No. 8513b.

Primary Examiner—Brian E. Hearn
Attorney, Agent, or Firm—Weldon F. Green

[57] ABSTRACT

This invention relates to environmentally sound hydrometallurgical methods and processes for extraction of cobalt, nickel and silver from complex concentrates. The finely ground minerals are converted during an oxidative caustic leach at elevated pressures and temperatures to insoluble metal hydroxides and are separated from soluble sodium arsenate and sodium sulphate. Cobalt and nickel are extracted from the caustic cake during a two-stage sulphuric acid leach. Solution purification for cobalt and nickel recovery proceeds on the basis that only one waste residue and one liquid effluent are generated which meet strict environmental standards. A small amount of cyanidation residue is generated after silver extraction by cyanidation from the acid leach residue. Metal values extraction reaches +99.0%. Arsenic and sulphur can be recovered in an innovative recycle system as sodium, zinc or copper arsenate chemicals and as anhydrous sodium sulphate.

46 Claims, 1 Drawing Figure

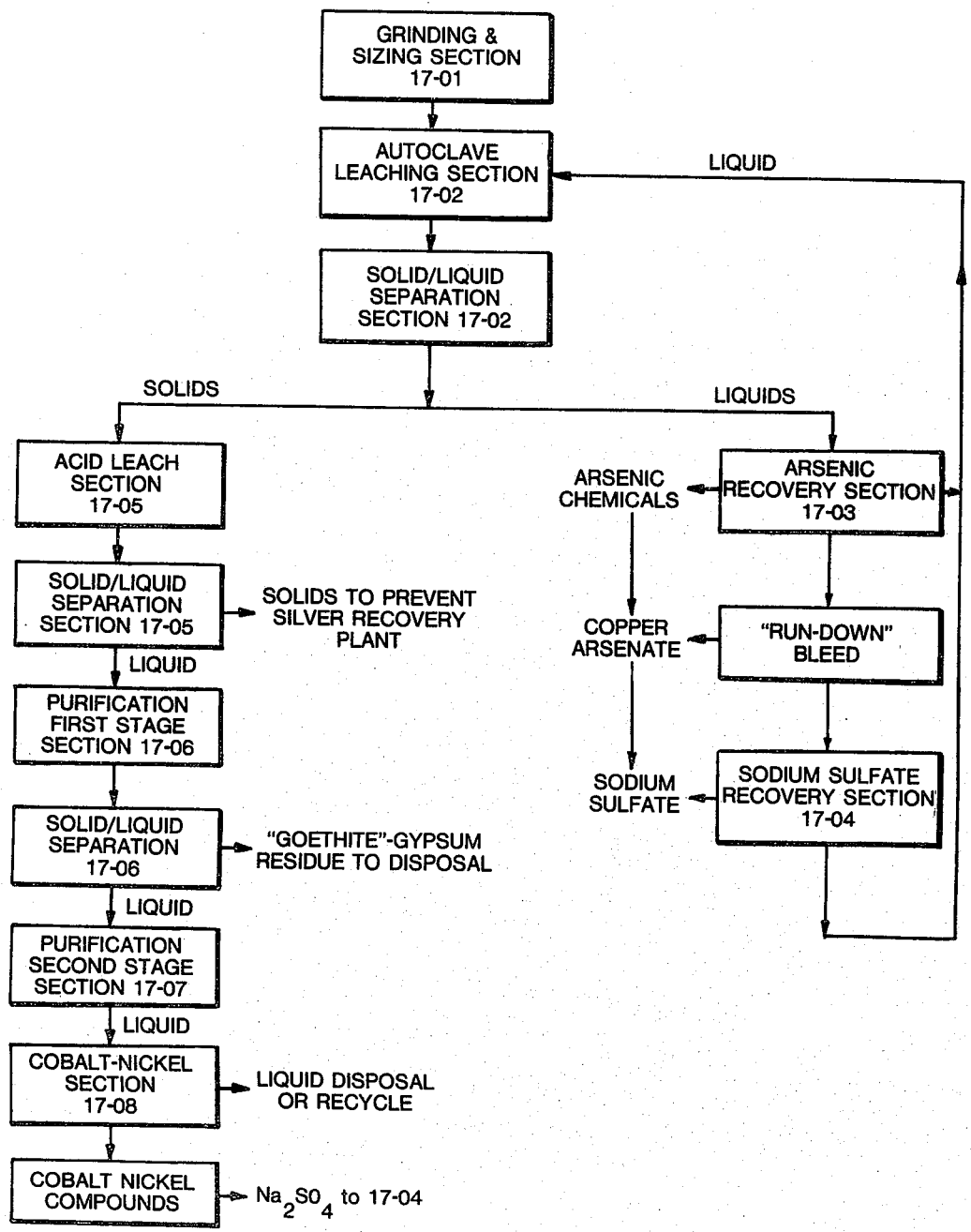

HYDROMETALLURGICAL PROCESS FOR EXTRACTING METAL VALUES FROM COMPLEX ORES CONTAINING ARSENIC AND SULFUR

FIELD OF INVENTION

This invention relates to improvements in hydrometallurgical processes for extracting and recovering cobalt, nickel and silver from complex ores which include substantial amounts of arsenic and sulphur, and from concentrates, residues or speiss derived therefrom as well as the separation from the ore or derivative feedstock and conversion into useful products of substantially all of the arsenic and sulphur.

BACKGROUND TO THE INVENTION

Common ores that include metal values such as cobalt, nickel, silver, iron, copper and mercury are accompanied by arsenic and sulphur. Deposits such as those occurring in the vicinity of Cobalt, Ontario, Canada serve as examples.

The Cobalt, Ontario, Canada region has produced over 400 million troy ounces of silver and unrecorded but very substantial amounts of cobalt. During the early years the main emphasis was on silver extraction and recovery, those procedures involving mainly gravity concentration, amalgamation and cyanidation.

The increase in the value of cobalt and silver in recent years has focussed attention upon available feedstocks containing those metal values. Such feedstocks include stockpiled leach residues, flotation concentrates, silver gravity concentrates, cobalt gravity concentrates and refinery speiss wherein cobalt may be present in a range of about 2%–20%, nickel in a range of from 1%–5%, silver in a range of from about 40 troy ounces per short ton to 2,000 troy ounces per short ton and containing iron in a range of from about 8%–20%, arsenic in a range of from about 10%–40%, sulphur in a range of from about 5%–20% and mercury up to 1/10th of 1%.

Substantially complete removal of the arsenic and sulphur from the concentrates, residues or speiss is necessary at the outset for economic recovery of the cobalt, nickel and silver values from such sources.

Moreover, not only is such initial separation of arsenic and sulphur essential in any method to be adopted, but such method should contemplate the conversion of those elements, arsenic and sulphur, into compounds having an economic value, a marketable commodity, which is not only of importance to the commercial considerations underlying the project, but will likely satisfy any environmental conditions that apply to any waste or effluent from the system to be introduced.

Known recovery methods include roasting of such feedstock to initially remove arsenic and sulphur followed by leaching and other steps. Those approaches are inefficient as well as objectionable both from the point of view of the character of the product generated and the high cost of the controls that must be exercised to meet operational as well as environmental standards. Accordingly, those alternatives are not attractive under prevailing conditions.

On the other hand, certain proposals for the treatment of such feedstock advocate oxidative pressure leaches involving ferric chloride, ferric sulphate and basic solutions for the separation and recovery of the constituents, with the last mentioned alternative having made the greatest impact during an evaluation of same.

More particularly, one such proposal recommending an oxidative pressure leach commences with a pretreatment of feedstock of the type under consideration, with a basic solution, particularly sodium hydroxide which is heated and then subjected to elevated pressures and temperatures in the presence of finely dispersed air. This proposal appears in U.S. Pat. No. 2,951,741. Initial removal of arsenic and sulphur from the concentrate containing cobalt, nickel and silver by oxidizing the finely divided ore constituents in the circumstances outlined, is accomplished by converting the arsenic and sulphur into soluble alkaline metal salts leaving the primary metallic values in an insoluble elemental state or as insoluble oxides.

An investigation of the approach disclosed by U.S. Pat. No. 2,951,741 has revealed that the directions are inadequate and incomplete and particularly fail to indicate or prescribe conditions that would ensure substantially complete separation of the arsenic and sulphur in the pretreatment stage or within a reasonable period of time; nor is efficient effective recovery of arsenic and sulphur in the form of marketable products given detailed consideration such that it could be said to merit exploitation as prescribed.

Finally, it is essential that any method adopted and the particular processes introduced should aim at recovering substantially all of the metal values in that the economic feasibility of the project is a controlling factor in the circumstances.

OBJECTS OF THE INVENTION

The object of this invention, therefore, is to provide improved hydrometallurgical methods and processes for the extraction or separation and recovery of substantially all of the cobalt, nickel and silver as well as the arsenic and sulphur from feedstock in the form of concentrates, residues or speiss derived from complex ores containing such mineralization that will be commercially and environmentally acceptable.

More particularly, it is an aim of this invention to provide an improved hydrometallurgical process for the pretreatment of such feedstock that ensures efficient, substantially complete separation of the arsenic and sulphur from such feedstock and the recovery of those constituents in marketable form and quantity and to the extent that any residual amount present in any waste or effluent from the operation is well within the permissible range of environmental standards.

It is also an object that this invention provide an improved process for the treatment of the primary metal values obtained following the pretreatment of the feedstock to remove substantially all of the arsenic and sulphur so that recovery of those metal values will approach a very high level of the order of 99% or higher.

These and other objects and features of this invention will become apparent from the following description considered in relation to the accompanying drawing identified as FIG. 1, which is a flow diagram illustrating the steps in the methods and processes embodying the invention.

DESCRIPTION OF THE INVENTION

A cross-section of available feedstock of the type under consideration is set forth in the following table:

| Feed | Composition of Feed | | | | | | |
|---|---|---|---|---|---|---|---|
| | % Co | oz/ton Ag | % Ni | % Fe | % As | % S | % Hg |
| Stockpile Cyanide Leach Residue | 2–8 | 40–100 | 1–2 | 10–15 | 15–40 | 8–15 | 0.06–0.09 |
| Flotation Concentrate | 2–3 | 500–800 | 1 | 12–14 | 10–15 | 12–14 | 0.06 |
| Silver Gravity Concentrate | 7–8 | 1500–2500 | 1–2 | 8–10 | 40–45 | 6–8 | 0.09 |
| Cobalt Gravity Concentrate | 10–15 | 100–200 | 2 | 10–20 | 40–50 | 5–10 | N.A. |
| Refinery Speiss | 15–20 | 1000–2000 | 5 | 15–20 | 20–30 | 15–20 | N.A. |

Essentially the methods adopted for separating or extracting mineral constituents from such feedstock in accordance with this invention may be summarized as follows:

(a) the step of grinding the feedstock to achieve requisite fineness;

(b) the step of leaching involving treating such feedstock in two stages with excess basic solution, preferably caustic solution, under controlled conditions of elevated temperature and pressure and in the presence of finely dispersed oxygen or air to achieve separation of the arsenic and sulphur as soluble alkaline salts and the selective recovery of the arsenic by maintaining a pH of the order of 13 or higher followed by a series of steps to recover the sulpher and including converting the arsenic to designated useful compounds;

(c) the step of leaching involving treating the solids recovered from the first mentioned caustic leaching step to a sulphuric acid leach in two stages and under controlled conditions of concentration and temperature, to achieve separation of the cobalt (and nickel) followed by a series of purification steps to recover same as oxides; and accompanied by (d) the step of cyanidation involving treating the solids recovered from the second of the two-stage acid leach with cyanide solution followed by a series of steps to generate metallic silver.

Feed Preparation Step

Extraction and recovery of substantially all of the valuable constituents of the ore or concentrates to meet the economics of the operations and avoid any penalty based upon environmental considerations requires that the feed be reduced to a fine particle size.

Coarse mineral particles supplied to the initial pressure leach will be rapidly surface-coated, hindering penetration by the leaching agent, thereby prolonging conversion times and possibly terminating conversion of these larger particles completely.

According to the method proposed, the ore and concentrates are ground or reground and screened on vibrating screens and recycloned to provide approximately 95%–400 mesh cyclone overflow, which overflow is thickened. Any underflow is redirected to the grinding stage.

Caustic Pressure Leach Step

Two-Stage Caustic Pretreatment

The controlling representative process chemistry applicable to these two stages is set out below:

(a) $FeAsS + 7NaOH + 3.5O_2 \rightarrow Fe(OH)_3 + Na_3AsO_4 + Na_2SO_4 + 2NaOH + H_2O$ (b) $Ag_2S + 2NaOH + 1.5O_2 \rightarrow 2Ag + Na_2SO_4 + H_2O$ (c) $CoAs_3 + 9NaOH + 4.5O_2 \rightarrow Co(OH)_3 + 3Na_3AsO_4 + 3H_2O$

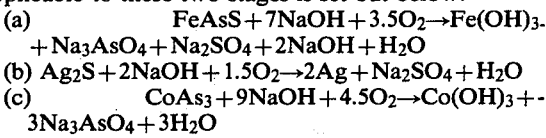

According to the invention, the thickened feed from the grinding, regrinding and recycloning stages will be treated as follows:

First Caustic Leaching Stage

On a 13–14% dry solids basis excess suitable basic leaching solution, preferably caustic, is added to a level of at least 125% of the stoichiometric amount required for complete As+S conversion. The resultant slurry is preheated to 90° C. and pumped to an autoclave wherein the slurry is pressurized with pure oxygen to the range of 130–140 PSIG.

Fine dispersion of oxygen is necessary for maximum oxygen utilization. Oxidation of the arsenic and sulphur proceeds rapidly and reaches a peak at 150° C. within approximately 30 minutes.

This slurry is held under pressure and finely dispersed compressed air introduced at 130–140 PSIG for a further 30-minute period. The vessel is then depressurized to 20 PSIG and discharged.

The slurry is then cooled down to a range of the order of 90°–95° C., and a solid/liquid separation is then undertaken with an appropriate centrifuge and the polish-filtered liquor hereinafter referred to as the "strong liquor" is then cooled down to 20° C.

Approximately 50–80% of the arsenic extracted in this initial first leaching stage will crystallize out of the "strong liquor" as high-purity sodium arsenate ($Na_3AsO_4 \cdot 12H_2O$). Those crystals are removed by centrifugation. The degree of sodium arsenate crystallization depends on concentrations of sodium arsenate, sodium hydroxide and sodium sulphate in the "strong liquor" phase.

The recovered crystals are either dried and marketed as anhydrous sodium arsenate or if desired or demand dictates can be redissolved in water for copper or zinc arsenate production to which the following process chemistry applies:

$3CuSO_4 + 2Na_3AsO_4 \rightarrow Cu_3(AsO_4)_2 + 3Na_2SO_4$
$3ZnSO_4 + 2Na_3AsO_4 \rightarrow Zn_3(AsO_4)_2 + 3Na_2SO_4$

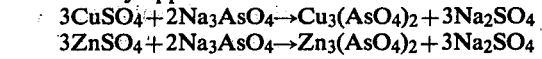

The filtered liquid remaining following centrifugation hereinafter referred to as the "stripped liquor" can be recycled to the next initial or first leaching stage or to a second or "releaching" stage to be described, or to a special stage hereinafter identified as the "pH run-down leach" stage.

Second Caustic Leaching Stage

The solids recovered from the solid/liquid separation of the first leaching stage are repulped in the "stripped liquor" and releached on the basis of approximately 15% dry solids after addition of sufficient caustic makeup to the order of 120–140 grams per liter.

The slurry of the second or "releaching" stage, as in the initial or first leaching stage, is heated to a range of the order of 90°–95° C. and pumped to the autoclave, and following the steps taken in the first leaching stage, after pressurizing with pure oxygen, the reaction proceeds and reaches a peak at a level of the order of 115°–130° C. after the elapse of approximately 30 minutes. The second or "releaching" stage is continued with compressed air for a further 30 minutes approximately whose completion can be determined by a simple test if desired.

The slurry discharged from the second or "releaching" stage has cooled down from its peak to approximately 90°–95° C., and a second solid/liquid separation is undertaken on a plate and frame filter press. The polish-filtered "strong liquor" of the second or "releaching" stage is then further cooled down to approximately 20° C. whereupon more of the arsenic extracted in the second or "releaching" stage is crystallized as high-purity $Na_3AsO_4.12H_2O$ and those crystals removed in the manner earlier described.

As in the case of the "stripped liquor" from the initial or first leaching stage, the "stripped liquor" of the second or "releaching" stage can be recycled or directed to the special "pH run-down leach" stage to be described.

The solids recovered from the solid/liquid separation of the second or "releaching" stage or "releached" solids are thoroughly washed on a plate and frame press for two reasons: to recover valuable entrained dissolved solids and return same to the recycle streams for the "stripped liquor"; as well as to keep the ultimately discharged effluent containing $Na_2SO_4$ at an environmentally acceptacle concentration of 4–6 grams per liter.

"pH Run Down Leaching" Stage

In order to control the recycle solution volume and keep sodium sulphate concentrations at 100–140 grams per liter, a treatment solution bleed-off is required. It has been established that approximately ¼ of the recycled solution should be bled off daily for lower sulphur feedstock in the range of from 6–10% sulphur and higher volumes bled off when sulphur in the feedstock is present in increased amounts.

In order to accomplish solution bleed-off, a special 15–20% dry solids batch is prepared wherein the solids are reslurried in "stripped liquor" of the character described above, and the slurry derived therefrom, after heating to the required level of the order of 90° C. is charged to the autoclave without any caustic makeup, but otherwise proceeds under conditions applicable to the caustic leaching stage.

Residual free caustic is used up rapidly and ultimately will be exhausted with the pH lowering or "running down" to 7.5–8.0 to the "pH run-down leach" stage.

The partially reacted solids of this selected batch are separated from the slurry and reslurried in "stripped liquor" and pumped to the autoclave feed tank for retreatment in accordance with the conditions applicable to the normal first caustic leaching stage.

The separated filtrate or liquor from the "pH run-down leach" stage is cooled to 20° C., polish-filtered and can be reacted for example with copper sulphate at 70°–80° C. to produce crystalline copper arsenate in accordance with the process chemistry earlier mentioned.

The copper arsenate filtrate has a pH of the order of 3–4 and will contain small amounts of copper and arsenic. The latter are removed by the addition of ferric sulphate solution and lime slurry to a pH of 6.5. After a further solid/liquid separation eliminating the precipitated copper and arsenic, the filtrate or liquor will include less than 10 ppm of arsenic, have a pH of the order of 6–7 with a concentration of 200–250 grams per liter of sodium sulphate which is recoverable by double evaporation-crystallization as anhydrous sodium sulphate.

Any fouled sodium sulphate spent liquor derived from the double crystallization-evaporation stage is recycled to the "stripped liquor" feed tank for the autoclave.

The two-stage caustic leach approach to the separation of the arsenic and sulphur from the feed is critical to the overall concept of the invention in that it establishes both rapid and substantially complete conversion of the arsenic and sulphur, and with a total retention time in the autoclave of from about 2–4 hours.

Reacting the first recovered leach solids with fresh and "stripped liquor" as explained in the preceding outline in the second or "releaching" stage results in the extraction and separation of approximately 95% of the arsenic and sulphur, a step essential to the conversion and ultimate recovery of the cobalt (and nickel) and silver to the order of 99% or higher in accordance with the following methods and procedures.

Acid Leaching Step

Two-Stage Sulphuric Acid Leach

First Acid Leach

The solids, or filtercake, recovered from the second caustic leaching stage or caustic releached solids are treated with sulphuric acid in a first acid leaching stage. This first acid leaching stage is run at approximately 10–12% dry solids and at an initial sulphuric acid concentration of 70 g/l.

The reaction proceeds as indicated:
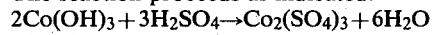
$2Co(OH)_3 + 3H_2SO_4 \rightarrow Co_2(SO_4)_3 + 6H_2O$ This first acid leaching stage is continued for approximately one hour. During the latter part of that time period additional fresh recovered solids, or filtercake from the second caustic leaching stage, are introduced into the slurry to lower the free acid content to approximately 5 g/l. This approach is useful in that it lowers lime usage and gypsum formation during subsequent neutralization of residual free sulphuric acid.

The cobalt pregnant solution derived from the reaction with sulphuric acid is decanted and polish-filtered before being delivered to the purification stage.

The Second Acid Leach

The solids recovered from the first acid leaching stage are separated on a suitable centrifuge and directed to a second acid leaching stage or "releaching" which is run at approximately 30% dry solids and excess sulphuric acid at an initial concentration of the order of between 400–500 g/l.

The slurry derived from the solids of the first acid leach is well agitated as the additional excess sulphuric acid is introduced.

The reaction is exothermic and generates heat of the order of from 95°–105° C., resulting in rapid and very high extraction rates of the cobalt and nickel. This second or "leaching" stage is continued for approximately one hour.

Extraction may be noted as complete by observing the colour change of the slurry from a dark grey hue to light grey. Small amounts of sodium chlorate can be added with caution to establish whether the reaction is complete and so ensure maximum cobalt (and nickel) extraction in that stage.

The resultant acid slurry is then diluted four to fivefold with wash water and filtered on a plate and frame press. The recovered filtrate, the second pregnant cobalt solution, is recycled as base to the next following initial or first acid leach stage.

The recovered second acid releached solids are washed free of solubles, namely the metal sulphates and sulphuric acid, and the resultant solids or filtercake delivered to the stage for extraction of silver.

Cobalt (and nickel) Purification

The cobalt pregnant filtrate recovered from the first acid leach stage is subjected to three stage purification.

The main chemical purification reactions are recorded as follows:

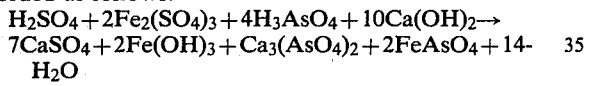
$H_2SO_4 + 2Fe_2(SO_4)_3 + 4H_3AsO_4 + 10Ca(OH)_2 \rightarrow$
$7CaSO_4 + 2Fe(OH)_3 + Ca_3(AsO_4)_2 + 2FeAsO_4 + 14H_2O$

First Purification Stage

The first stage of purification of the cobalt pregnant solution is carried out at approximately 80° C. with a lime slurry addition to a pH of 3.5. for maximum iron, arsenic and sulphate removal. Minor amounts of dissolved mercury can be removed by the addition of sodium sulphide.

The resultant "Goethite" gysum residue is washed and air dried and delivered to an approved site, whereupon lime slurry is sprayed on such residue to raise the pH to the order of 7.0.

Approximately 10% of the cobalt (and nickel) extracted in the initial or first acid leach stage will remain in the first purification cake as entrained liquor and is subsequently recovered either by thorough washing or repulping of same followed by solid/liquid separation and recycling the recovered filtrate to a special first stage purification step.

With this latter approach, cobalt losses in the final "Goethite" gypsum residue are held to approximately 0.5% of the total extracted.

Second Purification Stage

The second stage purification of the cobalt pregnant solution recovered from the first stage purification step includes oxidizing minor amounts of ferrous iron and removing residual copper, arsenic and ferric iron with a lime slurry to a pH of 6.8 followed by a solid/liquid separation.

The second purification stage cake is redissolved and recycled to a special first stage purification.

The second purification stage filtrate following a solid/liquid separation contains less than 1 ppm each of copper, iron and arsenic.

Third Stage Cobalt and Nickel Precipitation

Cobalt (and nickel) sulphates are precipitated with lime slurry to a pH of 11.

The slurry is filtered, and the resulting filtrate with a sodium sulphate concentration at a maximum of 4–6 g/l containing less than 1 ppm each of cobalt, nickel, copper, iron, arsenic and mercury can be discharged, the only effluent from the system.

Cobalt Recovery Stage

The recovered third stage solids or filtercake is repulped with a minimum of recycle wash water and sufficient sulphuric acid added to redissolve the cobalt (and nickel). The very pure calcium sulphate separated from the concentrated cobalt (nickel) solution is washed free of any entrained liquor, dried an packaged for marketing.

Up to 90% of the extracted cobalt (and nickel) report to the third purification stage in the form of concentrated cobalt/nickel solution. Cobalt recovery is achieved by precipitating same with chlorine gas and caustic at pH 5.5 to produce cobaltous-cobaltic hydroxide, which is filtered, washed, dried and calcined. The cobaltous-cobaltic oxide recovered contains less than 0.5% nickel.

The filtrate derived from the purification stage is treated with caustic whereby any residual cobalt and substantially all of the nickel are precipitated to a pH of 11.

The resultant recovered mixed solids or cake can either be recycled or offered to the marketplace.

The final filtrate from the third purification cobalt (and nickel) recovery stage containing approximately 100 grams per liter of sodium sulphate is treated in the sodium sulphate crystallization circuit for product recovery.

Silver Extraction

Extraction of the silver from the solids derived from the second stage of the acid leach or acid "releach" proceeds in accordance with the following chemistry:

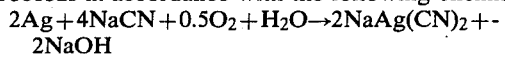
$2Ag + 4NaCN + 0.5O_2 + H_2O \rightarrow 2NaAg(CN)_2 + 2NaOH$

According to this proposal, silver cyanidation proceeds on the basis of 15–20% dry solids and is extremely rapid during the first 30 minute interval. The quantity of silver in the feedstock and the concentration of the free sodium cyanide determine the point when extraction ceases.

For low feeds, of the order of 200 ounces per ton and at 5 g/l of free sodium cyanide, silver extraction approaches the level of 99% within the first 30-minute interval.

Silver Recovery

Process chemistry in this stage proceeds as follows:
(1) $2NaAg(CN)_2 + Na_2S \rightarrow Ag_2S + 4NaCN$
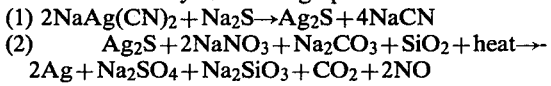
(2) $Ag_2S + 2NaNO_3 + Na_2CO_3 + SiO_2 + heat \rightarrow 2Ag + Na_2SO_4 + Na_2SiO_3 + CO_2 + 2NO$ Silver extracted as sodium silver cyanide is precipitated with sodium sulphide as silver sulphide while sodium cyanide is regenerated. Extracted mercuric cyanide is precipitated as HgS.

After drying, the silver sulphide is heat treated under vacuum and mercury removed in its elemental form.

The sodium sulphide is fluxed with soda ash, potassium nitrate, silica and borax and molten silver poured as impure silver bullion. The bullion can be further fire-refined to 99.5% silver.

Overall, the treatment provides silver extractions of the order of 99%.

Due to the forceful pretreatment, cyanicides are not present in the feed to cyanidation. Accordingly, consumption of cyanide and solution fouling do not occur except for possible thiocyanate formation during the silver sulphide precipitation with sodium sulphide.

It will be obvious that this approach has an advantage over ferric chloride or ferric sulphate pressure leach processes where large quantities of high moisture-laden ferric arsenate cakes must be cyanided to extract the silver.

The percentage of silver in the feed to the cyanidation step can vary from 200–10,000 troy ounces per short ton or from 0.68–34% silver.

The following data were recorded in relation to recovery of metal values and the other identified constituents from feedstock as indicated through implementation of the invention in accordance with conditions outlined above.

(1) Arsenic and Sulphur Extraction

|  | Dry kg | kg As | % Distr. | kg S | % Distr. |
|---|---|---|---|---|---|
| Feed | 238.0 | 50.69 | 100.00 | 17.69 | 100.00 |
| 1st Caustic Leach | 171.4 | 11.83 | 77.55 | 7.13 | 60.30 |
| 2nd Caustic Leach | 152.3 | 2.39 | 95.29 | 0.88 | 95.10 |

Extracted as $Na_3AsO_4 \cdot 12\,H_2O$  272.9 kg
Extracted as $Na_2SO_4$  75.8 kg
Recorded Weight Loss  36%

(2) Cobalt Extraction

|  | Dry kg | kg Co | % Distr. |
|---|---|---|---|
| Feed | 152.3 | 9.7472 | 100.00 |
| 2nd acid leach recovery | 69.1 | 0.0192 | 0.20 |
| Filtrate recovery |  | 9.7280 | 99.80 |

Recorded weight loss - 71%

(3) Silver Extraction

|  | Dry kg | oz/t Ag | g Ag | % Distr. |
|---|---|---|---|---|
| Feed | 69.1 | 244.2 | 573.70 | 100.00 |
| 1st Leach | 69.1 | 1.2 | 2.80 | 99.51 |
| 2nd Leach | 69.1 | 0.36 | 0.85 | 99.85 |
| 3rd Leach | 69.1 | 0.31 | 0.73 | 99.87 |

(4) Sulphate removal during Purification

|  | g/l $SO_4$ | % Removal |
|---|---|---|
| Co Pregnant Solution | 153.3 | — |
| 1st Stage Purification | 31.7 | 79.3 |
| 2nd Stage Purification | 24.7 | 83.9 |
| 3rd Stage Co—Ni Precipitation | 5.8 | 96.2 |
| 3rd Stage Filtrate |  |  |
| (Plant liquid effluent) |  |  |
| ppm Co, Ni, Fe, As, Cu, Hg | each 0.1 |  |

It will be understood that in describing and particularizing the improved methods and processes embodying the invention, representative steps and representative process chemistry have been adopted in order that it will be readily perceived in what manner the invention can be implemented.

Only the preferred embodiments of the invention have been disclosed whereas it will be apparent to those persons skilled in the art that certain alternatives are available and that details may be altered and chemical equivalents substituted without departing from the spirit and scope of the invention as defined in the appended claims.

What I claim is:

1. In a method for extracting and recovering cobalt, nickel or silver from feedstock derived from complex ore concentrates containing other mineralization including arsenic and sulphur and having a finely particulate character, the step of subjecting such feedstock to a first stage oxidative caustic leach at elevated temperatures and pressures and wherein the caustic introduced is calculated to produce in the converted reactants a pH of the order of 13 or greater followed by the steps of separating and recovering the liquor and solids phases therefrom respectively, followed by the further step of subjecting such recovered solids phase to a second stage oxidative caustic leach at elevated temperatures and pressures and wherein the caustic introduced is calculated to produce in the converted reactants a pH of the order of 13 or greater followed by the still further steps of separating and recovering the liquor and solids phases therefrom respectively.

2. The method according to claim 1 wherein the recovered solids phase derived from the second stage caustic leach is subjected to a first stage sulphuric acid leach proceeding in the presence of low residual free sulphuric acid followed by the steps of separating and recovering the liquor and solids phases therefrom respectively followed by the further step of subjecting such recovered solids phases to a second stage sulphuric acid leach proceeding in the presence of high residual free sulphuric acid followed by the steps of separating and recovering the liquor and solids phases therefrom respectively.

3. The method according to claim 2 wherein the residual free sulphuric acid in the first stage acid leach is of the order of 5 g/l.

4. The method according to claim 3 wherein the free residual sulphuric acid in the second stage acid leach is of the order of 400–500 g/l.

5. The method according to claims 2 or 3 or 4 wherein the recovered second stage acid leach liquor phase is diluted and recycled for use in the first stage acid leach.

6. The method according to claim 2 wherein the liquor recovered from the first stage acid leach is purified by subjecting same to the step of introducing lime slurring thereinto at an elevated temperature calculated to produce in the converted reactants a pH of the order of 3.5 or thereabouts followed by the further step of recovering the liquor phase and separating the solids phase therefrom.

7. The method according to claim 6 wherein the further recovered liquor phase is further purified by the step of introducing lime slurry thereinto calculated to produce in the converted reactants a pH of the order of 6.8 or thereabouts followed by the further steps of separating and recovering the liquor and solids phases therefrom.

8. The method according to claim 7 wherein the further recovered liquor phase is further treated by the step of introducing lime slurry thereinto calculated to produce in the converted reactants a pH of the order of 11.0 or thereabouts followed by the further steps of separating and recovering the liquor and solids phases therefrom.

9. The method according to claim 8 wherein the further recovered solids phase is further purified by the step of subjecting same to the addition of further sufficient sulphuric acid calculated to redissolve same followed by the further steps of separating and recovering the liquor and solids phases therefrom.

10. The method according to claim 9 wherein the further recovered liquor phase is subjected to the steps of introducing chlorine gas and caustic thereto calculated to produce in the converted reactants a pH of the order of 5.5 or thereabouts followed by the further steps of separating and recovering the liquor and solid phases therefrom.

11. The method according to claim 10 wherein the further recovered liquor phase is subjected to the step of introducing caustic thereinto calculated to produce in the converted reactants a pH of the order of 1.10 or thereabouts followed by the further steps of separating and recovering the liquor and solids phases therefrom.

12. The method according to claim 1 wherein the recovered solids phase is subjected to the step of introducing sodium hydroxide and sodium cyanide calculated to produce in the converted reactants a pH of the order of 11.5 or thereabouts followed by the further steps of separating and recovering the liquor and solids phases therefrom.

13. The method according to claim 12 wherein the further recovered liquor phase is subjected to the step of introducing sodium sulphide calculated to precipitate substantially all of the silver as silver sulphide followed by the further steps of separating and recovering the liquor and solid phases therefrom.

14. The method according to claim 1 wherein the temperature of each recovered liquor phase is so controlled that between 50–80% of the dissolved sodium arsenate is crystallized as $Na_3AsO_4.12H_2O$ followed by the further steps of separating and recovering of the liquor and solids phases therefrom.

15. The method according to claim 14 wherein the further liquor phase recovered from the separation of the $NA_3AsO_4.12H_2O$ is recycled for use in said oxidative caustic leaching steps.

16. The method according to claim 15 wherein said further recovered liquor phase recycled for use is directed to the first stage caustic leaching step and additional caustic is added in an amount sufficient to produce in the converted reactants a pH of the order of 13 or greater.

17. The method according to claim 15 wherein said further recovered liquor phase recycled for use is directed to the second stage caustic leaching step and and additional caustic is added in an amount sufficient to produce in the converted reactants a pH of the order of 13 or greater.

18. The method according to claim 15 wherein said further recovered liquor phase to be recycled for use having a concentration of the order of 100 g/l or greater of sodium sulphate is directed to a caustic leaching stage including fresh ore concentrate so as to consume residual caustic therein until a pH of the order of 7.5 to 8.0 is reached followed by the further step of separating and recovering the liquor and solids phases therefrom respectively.

19. The method according to claim 18 wherein said further recovered liquor phase from the converted reactants having a pH of the order of 7.5 to 8, is reacted at pH 3.5 or thereabouts and at elevated temperatures with copper sulphate solution so as to precipitate any crystalline copper arsenate followed by the further steps of separating and recovering the liquor and solids phases therefrom.

20. The method according to claim 19 wherein said further recovered liquor phase following separation of same from said recovered copper arsenate is treated with ferric sulphate and lime slurry to pH 7 or thereabouts followed by the further steps of separating and recovering the liquor and solids phases therefrom.

21. The method according to claim 20 wherein said further recovered liquid phase is subjected to the further steps of double evaporation/crystallization to yield sodium sulphate and to separate and recover the liquid phase therefrom.

22. The method according to claim 14 wherein the recovered sodium arsenate is redissolved and reacted at pH 3.5 or thereabouts and at elevated temperatures with one of copper sulphate and zinc sulphate solution to precipitate crystalline products of one of copper arsenate and zinc arsenate followed by the further steps of separating and recovering the liquor and solids phases therefrom.

23. The method according to claim 1 wherein the selected finely particulate character of the feedstock is of the order of $-400$ mesh or thereabouts.

24. The method according to claim 1 wherein the selected elevated temperatures are of the order of between 120°–140° C. and the selected elevated pressures are of the order of between 120–140 psig, and wherein the slurry of the first of said twostage oxidative caustic leach is subjected to preheating of the order of between 85°–100° C.

25. The method according to claim 1 wherein the initial reactants to the said first stage are calculated on the basis of from 13–14% dry solids and of between 150–180 g/l free caustic whereby the converted reactants have a pH of the order of 13 or greater and a residual caustic concentration of the order of between 60–80 g/l.

26. The method according to claim 23, 24 or 25 wherein the second stage reactants are calculated on the basis of from 14 to 15% dry solids and of between 120–140 g/l free caustic whereby the converted reactants produce a pH of the order of 13 or greater and a residual free caustic concentration of the order of between 60–80 g/l.

27. In a method for extracting and recovering cobalt, nickel and silver from feedstock derived from complex ore concentrates containing other mineralization including arsenic and sulphur and having a finely particulate character of the order of $-400$ mesh or thereabouts, the step of subjecting such feedstock to a two-stage oxidative caustic leach, commenced by heating the slurried intial reactants of feedstock and caustic to an elevated temperature of the order of between 85°–100° C., followed by the introduction of finely dispersed oxygen at a pressure of the order of between 120–140 psig and at a temperature of the order of between 120°–150° C. until the reactions are substantially complete followed by the steps of separating and recovering the liquor and solid phases therefrom, and reslurrying said recovered solids with caustic and repeating the introduction of finely dispersed oxygen at said range of pressures and at said range of temperatures until the reactions are substantially complete followed by the steps of separating and recovering the liquor and solids phases therefrom said caustic introduced in each of the aforementioned stages being an amount sufficient to produce in the converted reactants respectively a pH of the order of 13 or greater.

28. The method according to claim 27 wherein the initial reactants are calculated on the basis from 13-14% dry solids and of between 150-180 g/l free caustic whereby the converted reactants have a pH of the order of 13 or greater and a residual caustic concentration of the order of between 60-80 g/l.

29. A method according to claim 27 or 28 wherein the second stage reactants are calculated on the basis from 14-15% dry solids and of between 120-140 g/l free caustic whereby the converted reactants have a pH of the order of 13 or greater and a residual free caustic concentration of the order of between 60-80 g/l.

30. The method according to claim 27, wherein the recovered solids phase is subjected to a two-stage sulphuric acid leach, the first acid leach proceeding in the presence of low residual free sulphuric acid of the order of 5 g/l and the second stage acid leach preceding in the presence of high residual free sulphuric acid of the order of 400-500 g/l.

31. The method according to claim 30 wherein the recovered second stage acid leach liquor phase is diluted and recycled for use in the first stage acid leach.

32. The method according to claim 31 wherein the liquor recovered from the first stage acid leach is purified by subjecting same to the step of introducing lime slurry thereinto at an elevated temperature calculated to produce in the converted reactants a pH of the order of 3.5 or thereabouts followed by the further steps of separating and recovering the liquor and solids phases therefrom.

33. The method according to claim 32 wherein the further recovered liquor phase is further purified by the step of introducing lime slurry thereinto calculated to produce in the converted reactants a pH of the order of 6.8 or thereabouts followed by the further steps of separating and recovering the liquor and solids phases therefrom.

34. The method according to claim 33 wherein the further recovered liquor phase is further treated by the step of introducing lime slurry thereinto calculated to produce in the converted reactants a pH of the order of 11.0 or thereabouts followed by the further steps of separating and recovering the liquor and solids phases therefrom.

35. The method according to claim 34 wherein the further recovered solids phase is further purified by the step of subjecting same to the addition of further sufficient sulphuric acid calculated to redissolve same followed by the further steps of separating and recovering the liquor and solids phases therefrom.

36. The method according to claim 35 wherein the further recovered liquor phase is subjected to the step of introducing chlorine gas and caustic thereto calculated to produce in the converted reactants a pH of the order of 5.5 or thereabouts followed by the further steps of separating and recovering the liquor and solids phases therefrom.

37. The method according to claim 30 wherein the recovered solids phase is subjected to the step of introducing caustic and sodium cyanide calculated to produce in the converted reactants a pH of the order of 11.5 or thereabouts followed by the further steps of separating and recovering the liquor and solids phases therefrom.

38. The method of claim 37 wherein the further recovered liquor phase is subjected to the step of introducing sodium sulphide calculated to precipitate all of the silver sulphide followed by the further steps of separating and recovering the liquor and solids phases therefrom.

39. The method according to claim 27, wherein the temperature of the recovered liquor phase is so controlled that between 50-80% of the dissolved sodium arsenate is crystallized as $Na_3AsO_4.12H_2O$ followed by the further steps of separating and recovery of the liquor and solids phases therefrom.

40. The method according to claim 39 wherein the further liquor phase recovered from the separation of the $NA_3AsO_4.12H_2O$ is recycled for use in said two-stage oxidative leaching step.

41. The method according to claim 40 wherein said further recovered liquor phase recycled for use is directed to one of the first or second of said two-stage leaching step and additional caustic is added in an amount sufficient to produce in the converted reactants a pH of the order of 13 or greater.

42. The method according to claim 40 wherein said further recovered liquor phase recycled for use is directed to a first leaching stage of said two-stage leaching step and wherein the caustic concentration is maintained to produce in the converted reactants a pH of the order of 7.5 to 8 followed by the further steps of separating and recovering the liquid and solids phases therefrom.

43. The method according to claim 42 wherein said further recovered liquor phase from the converted reactants having a pH of the order of 7.5 to 8, is subjected to elevated temperatures so as to precipitate crystalline copper arsenate followed by the further steps of separating and recovering the liquor and solids phases therefrom.

44. The method according to claim 43 wherein said further recovered liquor phase following separation of same from said recovered copper arsenate is treated with ferric sulphate and lime slurry to pH 7 or thereabouts followed by the further steps of separating and recovering the liquor and solid phases therefrom.

45. The method according to claim 44 wherein said further recovered liquor phase is subjected to the further steps of double evaporation/crystallization to yield sodium sulphate and to separate and recover the liquor phase therefrom.

46. The method according to claim 39 wherein the recovered sodium arsenate is redissolved and reacted at pH 3.5 or thereabouts and at elevated temperatures with one of copper sulphate and zinc sulphate solution to precipitate crystalline products of one of copper arsenate and zinc arsenate followed by the further steps of separating and recovering the liquor and solids phases therefrom.

* * * * *